(12) United States Patent
Bislimi

(10) Patent No.: US 12,264,614 B2
(45) Date of Patent: Apr. 1, 2025

(54) WASTEGATE ACTUATOR MECHANISM OF A WASTEGATE SYSTEM OF A TURBOCHARGER

(71) Applicant: MITSUBISHI HEAVY INDUSTRIES ENGINE & TURBOCHARGER, LTD., Sagamihara (JP)

(72) Inventor: Kushtrim Bislimi, Almere (NL)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 99 days.

(21) Appl. No.: 18/014,630

(22) PCT Filed: Oct. 27, 2020

(86) PCT No.: PCT/IB2020/060049
§ 371 (c)(1),
(2) Date: Jan. 5, 2023

(87) PCT Pub. No.: WO2022/090765
PCT Pub. Date: May 5, 2022

(65) Prior Publication Data
US 2023/0258120 A1    Aug. 17, 2023

(51) Int. Cl.
*F02B 37/18*    (2006.01)
*F16C 7/02*    (2006.01)
(Continued)

(52) U.S. Cl.
CPC .............. *F02B 37/186* (2013.01); *F16C 7/02* (2013.01); *F16C 9/04* (2013.01); *F16C 33/043* (2013.01);
(Continued)

(58) Field of Classification Search
None
See application file for complete search history.

(56) References Cited

U.S. PATENT DOCUMENTS 3,085,312 A * 4/1963 Evans ................... F16C 23/045
29/520
3,662,462 A * 5/1972 Shiflet ................. F16C 11/0614
384/585

(Continued)

FOREIGN PATENT DOCUMENTS

DE    10 2017 202 961 A1    8/2018
EP    0 507 164 A2    10/1992
(Continued)

OTHER PUBLICATIONS

"SKF spherical plain bearings and rod ends," SKF Group, 2011, URL: <http://www.skf.com/binary/96-122020/6116_1-EN.pdf>, 218 pages total.

(Continued)

*Primary Examiner* — Matthew W Jellett
(74) *Attorney, Agent, or Firm* — Birch, Stewart, Kolasch & Birch, LLP

(57) ABSTRACT

The invention relates to a wastegate actuator mechanism comprising an elongated link plate and a pin which are rotatable relative to each other. The wastegate actuator mechanism further comprises a sliding assembly including a bushing fixedly connected to the link plate and a sleeve fixedly connected to the pin. Assembly of the wastegate actuator mechanism involves pressing the bushing into the eye of the link plate and allowing material of the link plate to deform and to be received in recessed portions of the bushing in the process and/or arranging the sleeve on the pin and allowing material of the pin to deform and to be received in recessed portions of the sleeve in a process of forming an end section of enlarged diameter on the pin.

12 Claims, 5 Drawing Sheets

(51) Int. Cl.
*F16C 9/04* (2006.01)
*F16C 33/04* (2006.01)
*F16K 31/46* (2006.01)

(52) U.S. Cl.
CPC .......... *F16K 31/46* (2013.01); *F16C 2202/04* (2013.01); *F16C 2206/82* (2013.01); *F16C 2226/52* (2013.01); *F16C 2226/62* (2013.01); *F16C 2360/22* (2013.01)

(56) References Cited

U.S. PATENT DOCUMENTS

| | | | |
|---|---|---|---|
| 3,710,674 A | 1/1973 | Tabor | |
| 5,073,038 A * | 12/1991 | O'Connell | F16C 11/0638 384/208 |
| 5,079,921 A * | 1/1992 | McCandless | F02B 37/22 60/602 |
| 5,216,928 A | 6/1993 | Kodachi | |
| 7,628,042 B2 | 12/2009 | Miglio | |
| 8,474,789 B2 * | 7/2013 | Shimada | F02B 37/186 251/231 |
| 9,261,132 B2 * | 2/2016 | McNeil | F16C 43/02 |
| 10,208,658 B2 | 2/2019 | Navarro | |
| 10,711,688 B2 * | 7/2020 | Tanigaki | F04D 27/0215 |
| 2010/0269629 A1 * | 10/2010 | Nunn | F16C 11/0614 384/276 |
| 2013/0089411 A1 | 4/2013 | Ward | |
| 2015/0137486 A1 | 5/2015 | Smith et al. | |

FOREIGN PATENT DOCUMENTS

| | | |
|---|---|---|
| EP | 0.572 771 A1 | 12/1993 |
| JP | 58-3762 U | 1/1983 |
| JP | 60-62619 U | 5/1985 |
| JP | 62-32205 U | 2/1987 |
| JP | 62-175232 U | 11/1987 |
| JP | 4-135875 U | 12/1992 |
| JP | 8-14263 A | 1/1996 |
| JP | 2014-173438 A | 9/2014 |
| JP | 2018-47810 A | 3/2018 |
| JP | 2018-168727 A | 11/2018 |
| WO | WO 2015/013061 A1 | 1/2015 |
| WO | WO 2020/070980 A1 | 4/2020 |

OTHER PUBLICATIONS

International Search Report for International Application No. PCT/IB2020/060049, dated Feb. 25, 2021.
Written Opinion of the International Searching Authority for International Application No. PCT/IB2020/060049, dated Feb. 25, 2021.

* cited by examiner
WASTEGATE ACTUATOR MECHANISM OF A WASTEGATE SYSTEM OF A TURBOCHARGER

FIELD OF THE INVENTION

The present invention relates to a wastegate actuator mechanism configured to be used in a wastegate system of a turbocharger. The present invention also relates to various components which are configured to be included in a wastegate actuator mechanism, particularly a link plate and a pin, and also a bushing configured to be pressed into an eye of the link plate and a sleeve configured to be arranged on the pin.

Further, the present invention relates to a method of fixing a bushing to a link plate that is configured to be included in a wastegate actuator mechanism of a wastegate system of a turbocharger, and to a method of fixing a sleeve to a pin that is configured to be included in a wastegate actuator mechanism of a wastegate system of a turbocharger.

BACKGROUND OF THE INVENTION

In the field of internal combustion engines, the use of a turbocharger for increasing the engine's efficiency and power output by generating forced air supply to the engine is well-known. The turbocharger comprises a turbine wheel that is configured to be rotated under the influence of a flow of exhaust gas from the engine. The turbocharger further comprises a compressor wheel that is coupled to the turbine wheel so as to be rotatable along with the turbine wheel. The compressor wheel is arranged in an air path in which air is taken in, compressed as the compressor wheel rotates, and is let out to the engine.

In general, the higher the flow of exhaust gas, the higher a boost pressure in the turbocharger. In order to regulate the boost pressure, the turbocharger is equipped with a wastegate system providing a bypass path for the incoming flow of exhaust gas and comprising a valve arranged in the bypass path and a wastegate actuator mechanism for controlling the position of the valve. By setting the position of the valve by means of the wastegate actuator mechanism, the extent to which exhaust gas is allowed to bypass the compressor wheel is determined, whereby the amount of exhaust gas that is allowed to flow to the compressor wheel is set. The wastegate actuator system is operated on the basis of various control signals including signals representative of the boost pressure in the turbocharger.

The present invention is related to the wastegate actuator mechanism, which mechanism comprises a lever plate coupled to the valve, an actuator arranged at a compressor housing of the turbocharger, and an elongated link plate extending from the actuator to the lever plate, wherein the link plate is coupled to the lever plate by engaging on a pin that is attached to the lever plate. In this configuration, the pin extends partially through an eye provided in the link plate, and the link plate and the pin are rotatable relative to each other about a rotation axis extending in the longitudinal direction of the pin. Hence, the link plate and the pin are wear partners as they slide relative to each other at the position where the pin extends through the eye of the link plate.

Contemporary engine arrangements involve increased temperatures of exhaust gas as a result of which use of the wastegate actuator mechanism is intensified. Also, especially in cases of the turbocharger being mounted on a three-cylinder or four-cylinder cylinder engine, impact of engine pulsations on the wastegate actuator mechanism is increased, whereby micromovements can be invoked in the wastegate actuator mechanism. All in all, these factors contribute to wear at the position of the sliding contact between the pin and the link plate.

SUMMARY OF THE INVENTION

It is an objective of the present invention to alleviate the situation of increased wear of the link plate and the pin in a practical manner without applying expensive measures such as simply manufacturing the link plate and the pin from a more durable material.

Aspects of the present invention are set out in the accompanying independent and dependent claims. Features from the dependent claims may be combined with features from the respective independent claims as appropriate and not merely as explicitly set out in the claims and explained in the following description.

In view of the foregoing, the present invention provides a wastegate actuator mechanism configured to be used in a wastegate system of a turbocharger, wherein the wastegate actuator mechanism comprises an elongated link plate and a pin that is attached to a lever plate, wherein the pin extends partially through an eye provided in the link plate, and wherein the link plate and the pin are rotatable relative to each other about a rotation axis extending in the longitudinal direction of the pin, wherein the wastegate actuator mechanism further comprises a sliding assembly arranged between the link plate and the pin at the position of the eye of the link plate, wherein the sliding assembly comprises a bushing that is fixedly connected to the link plate and a sleeve that is fixedly connected to the pin, and wherein an inner surface of the bushing and an outer surface of the sleeve are in sliding contact, and wherein at an interface of the bushing and the link plate, the bushing is provided with recessed portions and bulges of material of the link plate are received in the recessed portions and/or at an interface of the sleeve and the pin, the sleeve is provided with recessed portions and bulges of material of the pin are received in the recessed portions.

It follows from the above general definition of the wastegate actuator mechanism according to the present invention that the invention is functional at the position where the pin extends through the eye of the link plate. According to the present invention, intermediate components are provided at that position, namely a bushing and a sleeve which make up a sliding assembly in which an inner surface of the bushing and an outer surface of the sleeve are in sliding contact, wherein the bushing is received in the eye of the link plate and the sleeve is arranged on the pin. The present invention pertains to the way in which the bushing is fixedly connected to the link plate and/or the way in which the sleeve is fixedly connected to the pin. In this respect, the present invention provides at least one of the following configurations: i) at an interface of the bushing and the link plate, the bushing is provided with recessed portions and bulges of material of the link plate are received in the recessed portions, and ii) at an interface of the sleeve and the pin, the sleeve is provided with recessed portions and bulges of material of the pin are received in the recessed portions. Hence, the present invention provides a form closure configuration at the position of the interface of the bushing and the link plate and/or the position of the interface of the sleeve and the pin, while the sliding action that takes place between the link plate and the pin during operation of the wastegate system is fully shifted to the interface of the bushing and the sleeve, and an improvement of wear behavior can be achieved by choosing an appropriate material in respect of the bushing and the sleeve or at least the sliding contact surfaces thereof. Due to the application of the invention, the fixed connection of the bushing to the link plate and/or the sleeve to the pin is secured and cannot be deteriorated under the influence of forces associated with normal operation of the wastegate actuator mechanism, so that the advantage of improved wear behavior is not compromised.

A practical way of achieving the desired form closure involving bulges of material of a first component being received in recessed portions of a second component is providing the second component with the recessed portions and choosing shapes and dimensions of the respective components in such a way that the first component is deformed in a process of fitting the second component in/on the first component, wherein particularly material of the first component is forced to flow to the recessed portions of the second components. This implies that it is advantageous if the second component comprises another material than the first component, the material of the second component having a higher hardness than the material of the first component. In terms of the link plate and the bushing, this means that it is advantageous if the bushing, at least at the position of an outer portion thereof, comprises another material than the link plate, the material of the bushing having a higher hardness than the material of the link plate. In terms of the pin and the sleeve, this means that it is advantageous if the sleeve, at least at the position of an inner portion thereof, comprises another material than the pin, the material of the sleeve having a higher hardness than the material of the pin.

In respect of the option of the bushing being provided with recessed portions and bulges of material of the link plate being received in the recessed portions, the following notable options are mentioned, which may be applied in appropriate combinations if so desired:

- the bulges of material of the link plate and the recessed portions of the bushing may be configured to prevent relative movement of the link plate and the bushing in a peripheral direction, i.e. in a direction about the rotation axis of the relative movement of the link plate and the pin or, in other words, in a sliding direction of the sliding assembly,
- the recessed portions of the bushing may be distributed on the bushing in a peripheral direction, so that forces acting on the bushing in the peripheral direction are distributed on the bushing and peak forces are avoided,
- the bushing may have at least one chamfered outer rim, and the recessed portions of the bushing may comprise notches which are arranged in the at least one chamfered outer rim,
- the bushing may have a chamfered outer rim at one axial end thereof and a chamfered outer rim at the other axial end thereof, in which case it is possible to have a configuration in which the bushing is locked in the longitudinal direction between bulges of material of the link plate located at the two axial ends of the bushing, and
- the recessed portions of the bushing may comprise grooves which extend along an outer surface of the bushing in the longitudinal direction.

In respect of the option of the sleeve being provided with recessed portions and bulges of material of the pin being received in the recessed portions, the following notable options are mentioned, which may be applied in appropriate combinations if so desired:

- the bulges of material of the pin and the recessed portions of the sleeve are configured to prevent relative movement of the pin and the sleeve in a peripheral direction,
- the recessed portions of the sleeve are distributed on the sleeve in a peripheral direction,
- at the interface of the sleeve and the pin, the sleeve is provided with spikes penetrating into the material of the pin, which is a further measure contributing to the fixation of the sleeve on the pin, and
- at the interface of the sleeve and the pin, the pin has a conical portion that is shaped like a truncated cone, wherein the inner surface of the sleeve tapers at the position of a portion of the sleeve that closely surrounds the conical portion of the pin, so that differences of thermal expansion of the sleeve and the pin can be compensated for.

The present invention further relates to a wastegate system of a turbocharger, including a wastegate actuator mechanism as described in the foregoing, and also to a turbocharger, comprising a wastegate system including the wastegate actuator mechanism. With reference to the above explanation of the background of the invention, it is noted that the wastegate system is configured to provide a bypass path for an incoming flow of exhaust gas in the turbocharger and comprises a valve arranged in the bypass path and the wastegate actuator mechanism for controlling the position of the valve. Also, with reference to the above explanation of the background of the invention, it is noted that the turbocharger is configured to be used in cooperation with an internal combustion engine, and that the turbocharger comprises a turbine wheel that is configured to be rotated under the influence of a flow of exhaust gas from the engine, and a compressor wheel that is coupled to the turbine wheel so as to be rotatable along with the turbine wheel, and that is configured to compress air to be supplied to the engine by the turbocharger.

Still further, the present invention relates to separate components of the wastegate actuator mechanism, particularly the bushing, the sleeve, the link plate and the pin, wherein it is noted that various particular features of these components are already addressed in the foregoing.

It follows from the foregoing that in terms of a method, the present invention relates to a method of fixing a bushing to a link plate that is configured to be included in a wastegate actuator mechanism of a wastegate system of a turbocharger, and that the present invention also relates to a method of fixing a sleeve to a pin that is configured to be included in a wastegate actuator mechanism of a wastegate system of a turbocharger.

The first method has the following features: i) the bushing is dimensioned to snugly fit into an eye of the link plate, ii) the bushing is provided with recessed portions at positions where the bushing is to contact the link plate, and iii) the link plate is provided with at least one edge extending at a position where the link plate is to contact the bushing, and the first method comprises the following step: pressing the bushing into the eye of the link plate and thereby causing deformation of the at least one edge of the link plate and inducing formation of bulges of material of the link plate at the position of the recessed portions of the bushing through flows of material of the link plate at the position of the at least one edge into the recessed portions of the bushing.

The second method has the following feature: the sleeve is provided with recessed portions at positions where an inner surface of the sleeve is to face an outer surface of the pin, and the second method comprises the following steps: i) arranging the sleeve on the pin and ii) exerting pressure on the pin for the purpose of forming an end section of enlarged diameter on the pin and thereby causing deformation of material of the pin and inducing formation of bulges of material of the pin at the position of the recessed portions of the sleeve through flows of material of the pin into the recessed portions of the sleeve.

It can be understood that further aspects of methods according to the present invention may relate to appropriate use of one or more of a bushing, sleeve, link plate and pin having any of the features or combinations of features as disclosed in the foregoing.

BRIEF DESCRIPTION OF THE DRAWINGS

Further features and advantages of the present invention will become apparent from the description of the invention by way of exemplary and non-limiting embodiments of a turbocharger and components of a wastegate actuator mechanism of a wastegate system of the turbocharger.

The person skilled in the art will appreciate that the described embodiments of the turbocharger and the components of the wastegate actuator mechanism according to the present invention are exemplary in nature only and not to be construed as limiting the scope of protection defined in the claims in any way. The person skilled in the art will realize that alternatives and equivalent embodiments of the wastegate actuator mechanism can be conceived and reduced to practice without departing from the scope of protection of the present invention.

Figure 1:
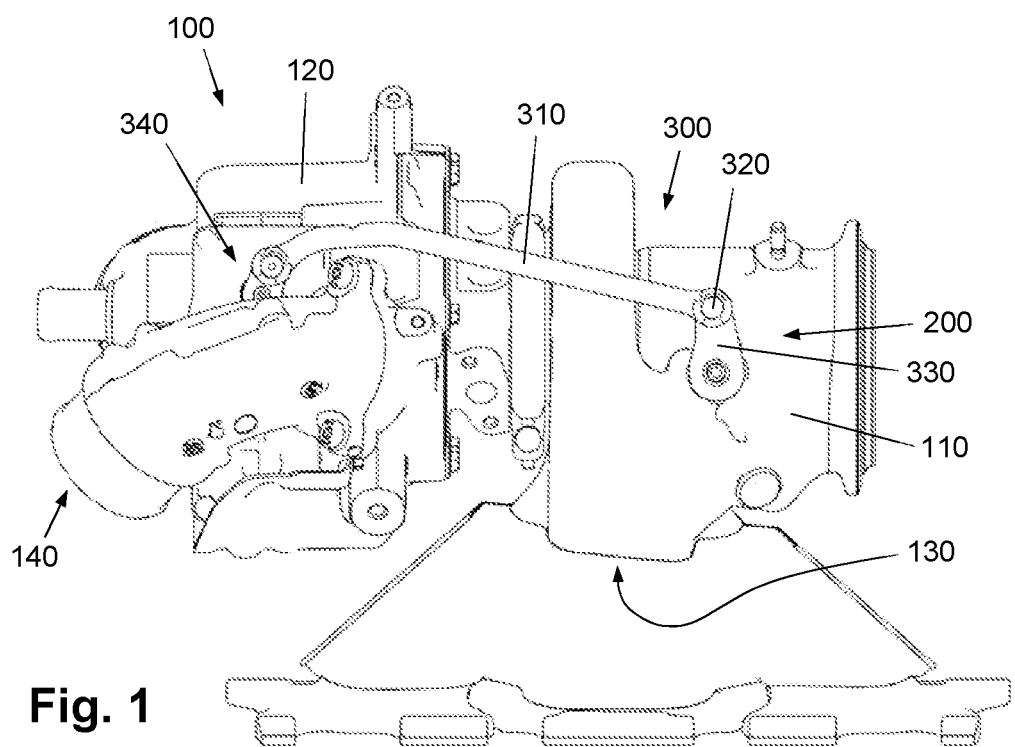
Figure 2:
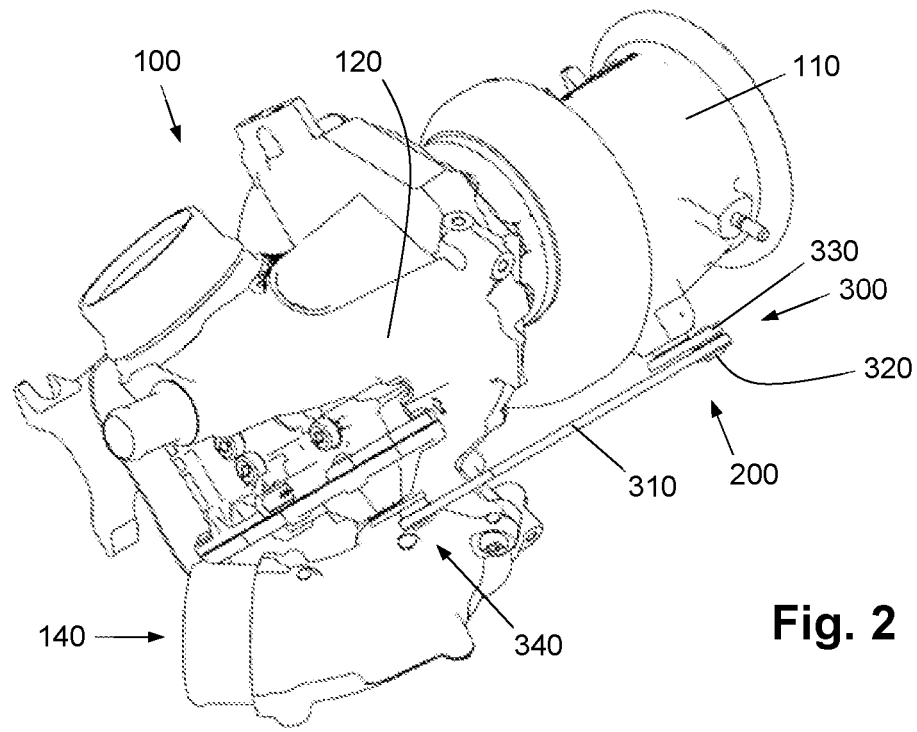
Figure 3:
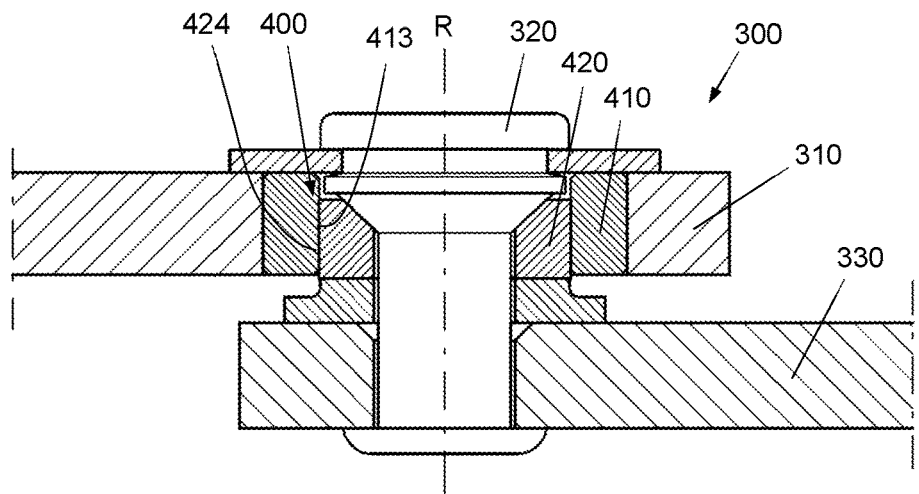
Figure 4:
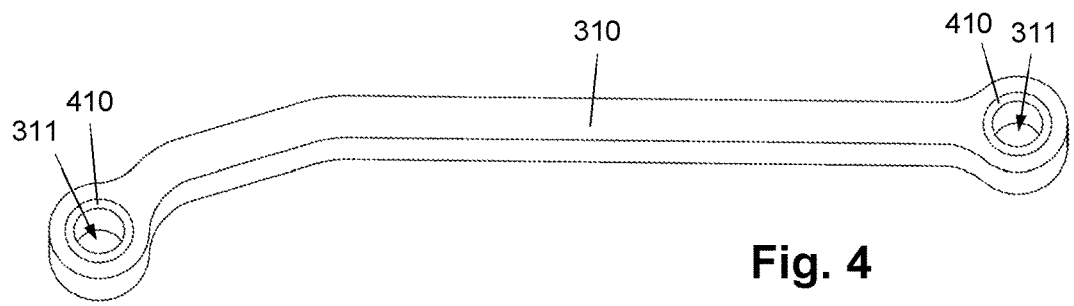
Figure 5:
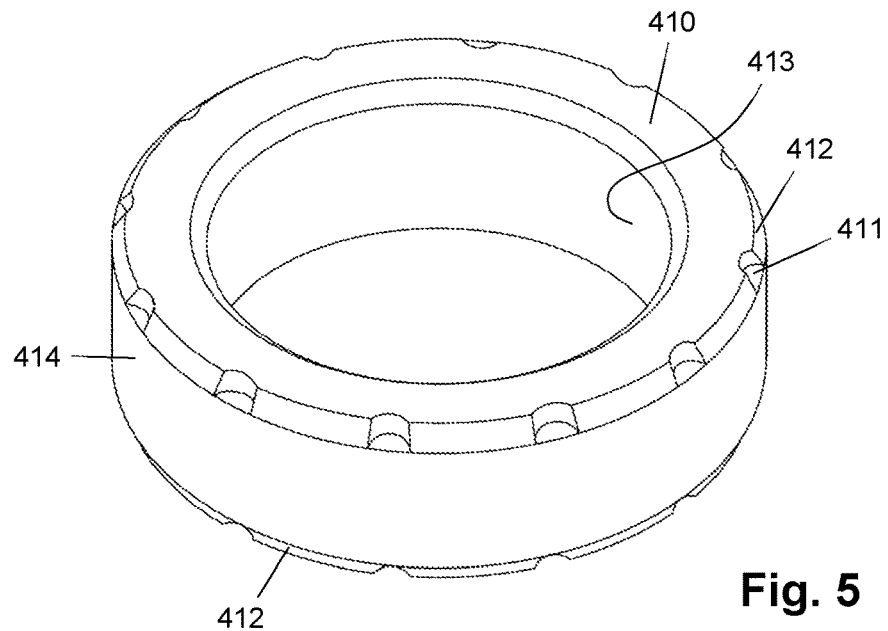
Figure 6:
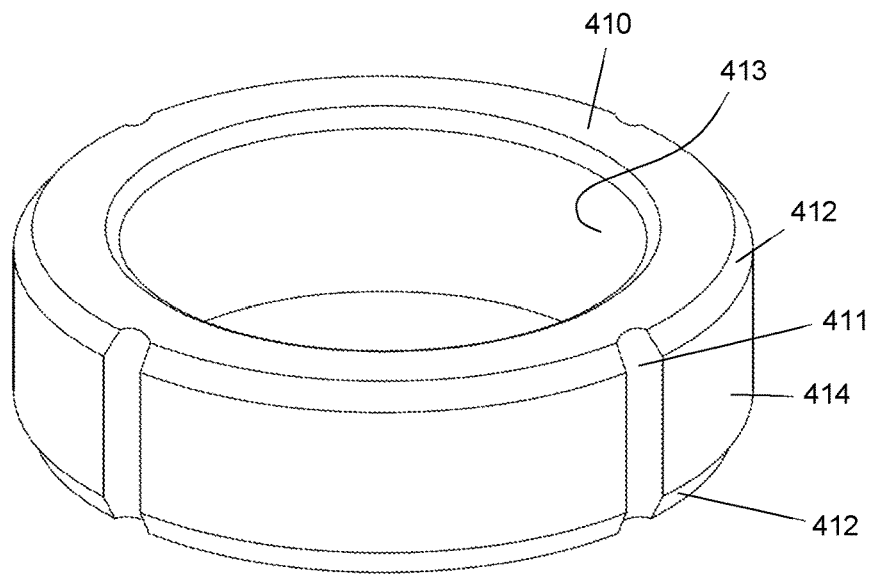
Figure 7:
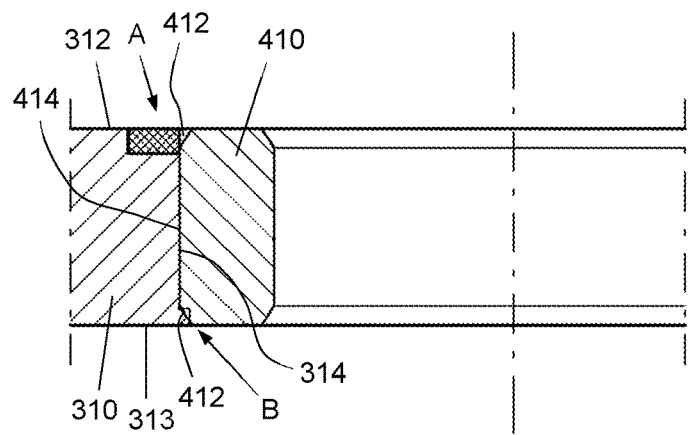
Figure 8:
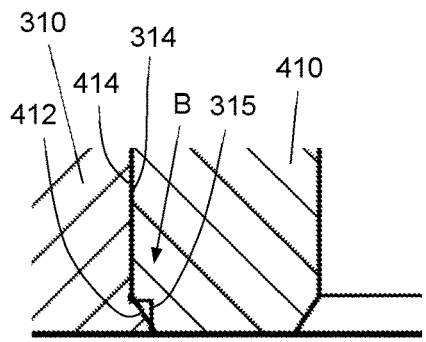
Figure 9:
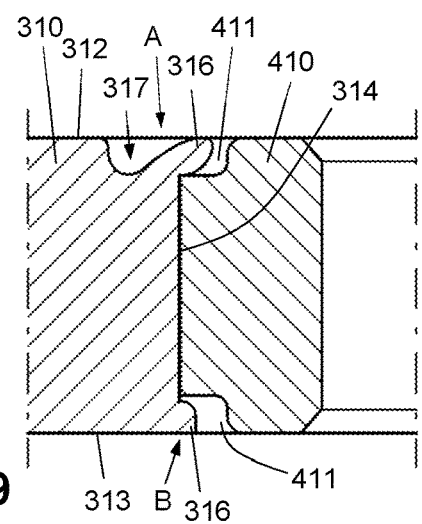
Figure 10:
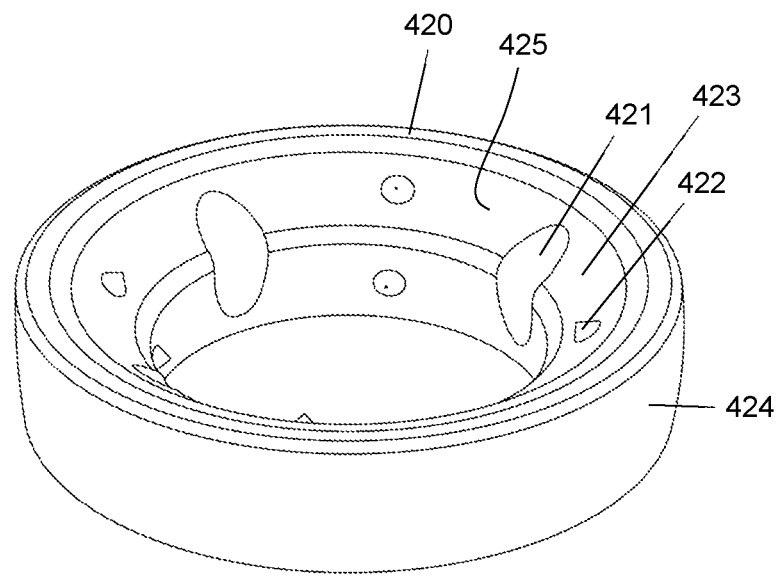
Figure 11:
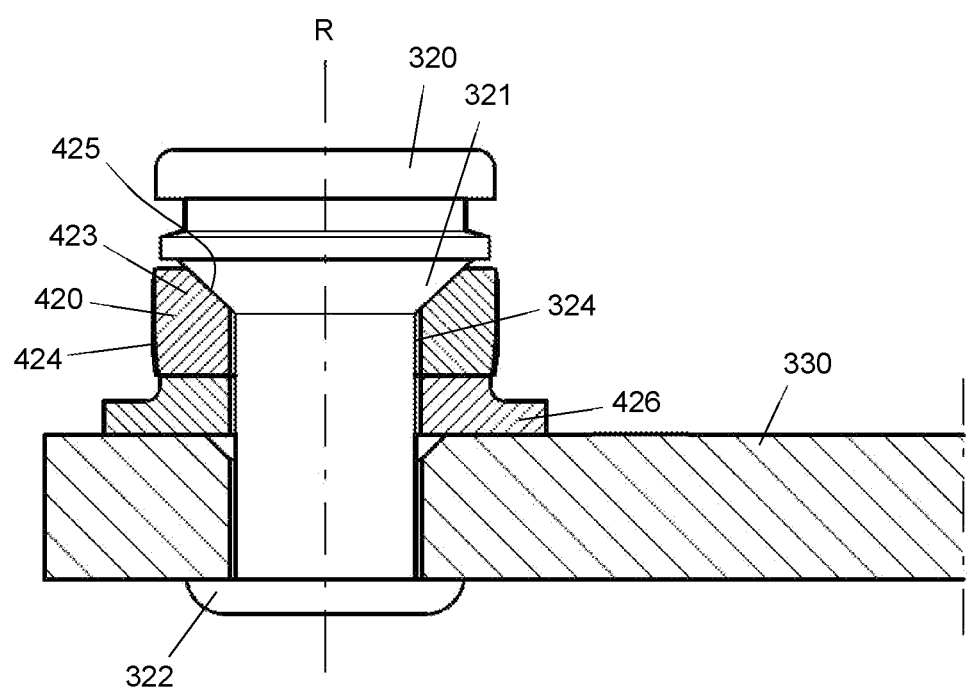
Figure 12:
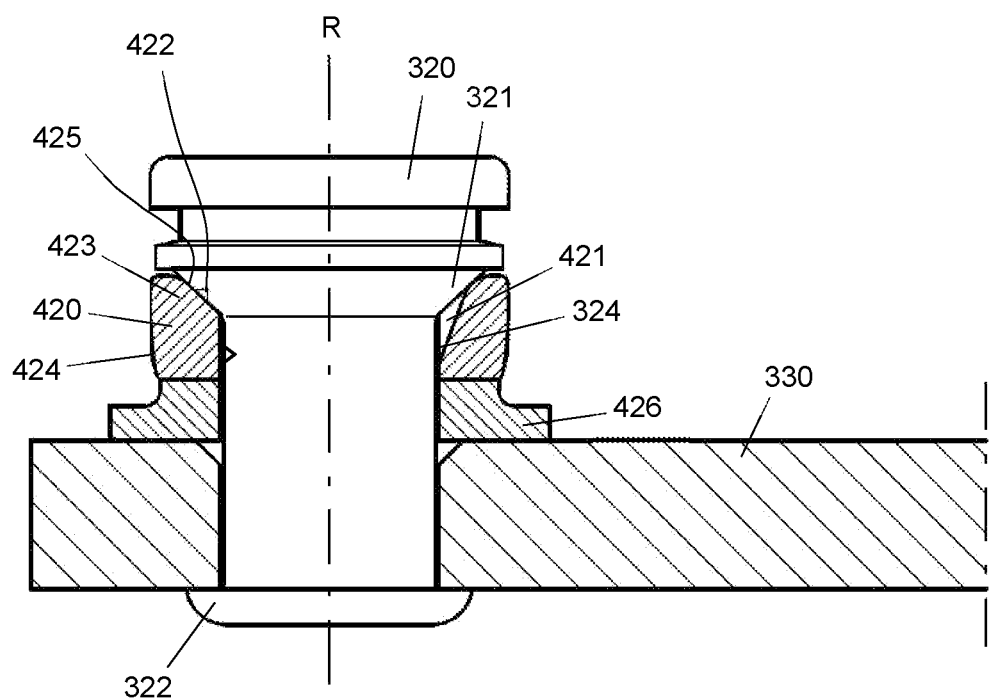

Reference will be made to the figures on the accompanying drawing sheets. The figures are schematic in nature and therefore not necessarily drawn to scale. Further, equal reference numerals denote equal or similar parts. On the attached drawing sheets, FIGS. 1 and 2 diagrammatically show a turbocharger according to an embodiment of the invention;

FIG. 3 diagrammatically shows a portion of an embodiment of a wastegate actuator mechanism of a wastegate system of the turbocharger;

FIG. 4 diagrammatically shows an embodiment of a link plate of the wastegate actuator mechanism;

FIG. 5 diagrammatically shows an embodiment of a bushing included in the wastegate actuator mechanism;

FIG. 6 diagrammatically shows an alternative embodiment of the bushing;

FIG. 7 diagrammatically shows a portion of an assembly of a link plate and a bushing, wherein the bushing is located in an eye of the link plate;

FIG. 8 is an enlarged view of a detail of FIG. 7;

FIG. 9 illustrates a form closed arrangement of the link plate and the bushing;

FIG. 10 diagrammatically shows an embodiment of a sleeve included in the wastegate actuator mechanism;

FIG. 11 diagrammatically shows an assembly of a lever plate, a pin and a sleeve of the wastegate actuator system; and FIG. 12 illustrates a form closed arrangement of the pin and the sleeve.

DETAILED DESCRIPTION OF EMBODIMENTS

FIGS. 1 and 2 diagrammatically show a turbocharger 100 according to an embodiment of the invention. The general design of the turbocharger 100 is comparable to general designs of commonly known turbochargers and will therefore only be shortly elaborated on in the present text.

The turbocharger 100 comprises a turbine wheel accommodated in a turbine housing 110 and a compressor wheel accommodated in a compressor housing 120. The turbine wheel and the compressor wheel are connected to each other via a rotation shaft so as to be integrally rotatable. An inlet 130 of the turbocharger 100 is connectable to an outlet of exhaust gas of an internal combustion engine. During operation, an incoming flow of exhaust gas causes rotation of the interconnected turbine wheel and compressor wheel. The compressor wheel acts to compress air, and the compressed air thus obtained is let out through an outlet 140 of the turbocharger 100 that is connectable to an air inlet of the internal combustion engine.

The turbocharger 100 comprises a wastegate system 200 providing a bypass path for the incoming flow of exhaust gas and comprising a valve arranged in the bypass path and a wastegate actuator mechanism 300 for controlling the position of the valve. For example, when the engine discharges an excessive amount of exhaust gas, the wastegate actuator mechanism 300 is operated to open the valve so that only a portion or all of the exhaust gas is allowed to bypass the turbine wheel. In that way, excessive increase of rotation speed of the turbine is prevented and boost pressure is kept limited.

In the shown embodiment, the wastegate actuator mechanism 300 comprises a lever plate 330 coupled to the valve, an actuator 340 arranged at the compressor housing 120, and an elongated link plate 310 extending from the actuator 340 to the lever plate 330, wherein the link plate 310 is coupled to the lever plate 330 by engaging on a pin 320 that is attached to the lever plate 330. The actuator 340 may also include a lever plate as is the case in the shown embodiment. The pin 320 extends partially through an eye 311 provided in the link plate 310, and the link plate 310 and the pin 320 are rotatable relative to each other about a rotation axis R extending in the longitudinal direction of the pin 320. During operation, the link plate 310 functions to transfer a driving force from the actuator 340 to the valve.

With reference to FIG. 3, it is noted that the wastegate actuator mechanism 300 further comprises a sliding assembly 400 arranged between the link plate 310 and the pin 320 at the position of the eye 311 of the link plate 310. The sliding assembly 400 comprises a bushing 410 that is fixedly connected to the link plate 310 and a sleeve 420 that is fixedly connected to the pin 320, wherein an inner surface 413 of the bushing 410 and an outer surface 424 of the sleeve 420 are in sliding contact. Advantageously, the bushing 410 and the sleeve 420 are made of a hard/durable material such as tungsten carbide, whereas the link plate 310 and the pin 320 may be made of another, less durable material such as stainless steel.

FIG. 4 illustrates the option of the link plate 310 being provided with a bushing 410 in each of two eyes 311 thereof. This implies that a sliding assembly 400 comprising a bushing 410 and a sleeve 420 can also be applied at the position of the actuator 340.

FIG. 5 diagrammatically shows an embodiment of the bushing 410. The bushing 410 is generally ring-shaped and has a generally circular inner periphery as well as a generally circular outer periphery. In the first place, it is emphasized that the bushing 410 has a smooth inner surface 413 that is configured to function as one of two cooperating sliding contact surfaces of the sliding assembly 400. In the second place, it is noted that the bushing 410 is provided with chamfered outer rims 412 at each of its two axial ends and recessed portions 411 which are arranged in the respective chamfered outer rims 412. In each of the respective chamfered outer rims 412, the recessed portions 411 are distributed on the bushing 410 in a peripheral direction, in a regular pattern according to which a peripheral distance between two adjacent recessed portions 411 is the same for any two adjacent recessed portions 411. In the embodiment of the bushing 410 shown in FIG. 5, the recessed portions 411 comprise notches. FIG. 6 diagrammatically shows an alternative embodiment of the bushing 410 in order to illustrate the fact that the recessed portions 411 may further comprise grooves which extend along an outer surface 414 of the bushing 410 in the longitudinal direction.

As mentioned in the foregoing, in the wastegate actuator mechanism 300, the bushing 410 is fixedly connected to the link plate 310. With reference to FIGS. 7, 8 and 9, and with reference to the foregoing description of the embodiment of the bushing 410 shown in FIG. 5, a practical way in which the fixed connection may be realized will now be explained. It is noted that it is important to have the fixed connection in order to avoid (micro)movements between the bushing 410 and the link plate 310, both in peripheral direction and longitudinal direction.

According to the invention, the bushing 410 is pressed into an eye 311 of the link plate 310 during an assembling process of the wastegate actuator mechanism 300. The bushing 410 is dimensioned to snugly fit into the eye 311 of the link plate 310. An outer diameter of the bushing 410 may be chosen so as to be the same as or to be just slightly larger than an inner diameter of the eye 311. Further, the link plate 310 is designed with special peripheral deformation areas A, B, wherein an entry deformation area A is located at a transition position of one of the main body surfaces 312, 313 of the link plate 310 to the inner surface 314 of the eye 311, and wherein a stop deformation area B is located at a transition position of the other of the main body surfaces 312, 313 of the link plate 310 to the inner surface 314 of the eye 311. The stop deformation area B comprises a machined peripheral stop edge 315.

When the bushing 410 is pressed into the eye 311, this is done from the side of the link plate 310 where the entry deformation area A is present. The movement of the bushing 410 is stopped when the chamfered outer rim 412 of the bushing 410 that is at the front as seen in the direction of movement of the bushing 410 reaches the stop edge 315. Under the influence of the pressure that is exerted on the bushing 410, the stop edge 315 is deformed and formation of bulges of material 316 of the link plate 310 is induced at the position of the recessed portions 411 of the bushing 410 through flows of material of the link plate 310 at the position of the stop edge 315 into the recessed portions 411 of the bushing 410. Further, at the position of the deformation area A, formation of bulges of material 316 of the link plate 310 is induced as well by exerting pressure on the deformation area A by means of a suitable pressing tool and thereby displacing material of the link plate 310 in a direction that is radially inward. In the process, as a result of the displacement of the material, a peripheral recess 317 is formed in the deformation area A. On the basis of the bulges of material 316 of the link plate 310 being received in the recessed portions 411 of the bushing 410, at both axial ends of the bushing 410, relative movement of the link plate 310 and the bushing 410 in both a peripheral direction and the longitudinal direction is prevented.

FIG. 10 diagrammatically shows an embodiment of the sleeve 420. The sleeve 420 is generally ring-shaped and has a generally circular inner periphery as well as a generally circular outer periphery. In the first place, it is emphasized that the sleeve 420 has a smooth outer surface 424 that is configured to function as one of two cooperating sliding contact surfaces of the sliding assembly 400. Advantageously, the outer surface 424 has a slightly convexly curved outline in the longitudinal direction, so that sliding contact between the sleeve 420 and the bushing 410 takes place along defined, more or less central portions of the outer surface 424 of the sleeve 420 and the inner surface 413 of the bushing 410. In the second place, it is noted that the inner surface 425 of the sleeve 420 tapers at the position of a widened portion 423 of the sleeve 420 that is intended to surround a conical portion 321 of the pin 320 that is shaped like a truncated cone, as can be seen in FIGS. 11 and 12. In the third place, it is noted that the sleeve 420 is provided with recessed portions 421 in the inner surface 425 thereof. The recessed portions 421 are distributed on the sleeve 420 in a peripheral direction, in a regular pattern according to which a peripheral distance between two adjacent recessed portions 421 is the same for any two adjacent recessed portions 421. In the embodiment of the sleeve 420 shown in FIG. 10, the recessed portions 421 comprise notches extending along a considerable part of the sleeve 420 as seen in the longitudinal direction. Further, the sleeve 420 is provided with spikes 422 which are arranged so as to project inwardly from the inner surface 425 of the sleeve 420.

As mentioned in the foregoing, in the wastegate actuator mechanism 300, the sleeve 420 is fixedly connected to the pin 320. A practical way in which the fixed connection may be realized will now be explained. It is noted that it is important to have the fixed connection in order to avoid (micro)movements between the sleeve 420 and the pin 320, both in peripheral direction and longitudinal direction.

According to the invention, the sleeve 420 is arranged on the pin 320 during an assembling process of the wastegate actuator mechanism 300, while the pin 320 is in a manufacturing state in which the pin 320 is not yet provided without the end section 322 of enlarged diameter as shown in FIGS. 11 and 12. As suggested in the foregoing, a correct position of the sleeve 410 on the pin 320 involves the widened portion 423 of the sleeve 420 surrounding the conical portion 321 of the pin 320. Subsequently, the combination of the pin 320 and the sleeve 420 arranged on the pin 320 is put in place relative to the lever plate 330, wherein a portion of the pin 320 is inserted through an eye of the lever plate 330. A fixed configuration of the pin 320, the sleeve 420 and the lever plate 330 is realized in a process of forming the end section 322 of enlarged diameter under the influence of pressure, i.e. in a riveting process of the pin 320. As a result of the riveting process, a configuration is obtained in which the lever plate 330 and the sleeve 420 are clamped between the end section 322 of the pin 320 on the one side and the conical portion 321 of the pin 320 on the other side. During the riveting process, material of the pin 320 is made to deform and formation of bulges of material 323 of the pin 320 is induced at the position of the recessed portions 421 of the sleeve 420 through flows of material of the pin 320 into the recessed portions 421 of the sleeve 420. Also, the spikes 422 of the sleeve 420 penetrate into the material of the pin 320.

On the basis of the bulges of material 323 of the pin 320 being received in the recessed portions 421 of the sleeve 420, relative movement of the pin 320 and the sleeve 420 in a peripheral direction is prevented. On the basis of the fact that the spikes 422 of the sleeve 420 penetrate into the material of the pin 320, further fixation results are achieved. On the basis of the widened portion 423 of the sleeve 420 surrounding the conical portion 321 of the pin 320, a configuration that is adapted to compensate for differences of thermal expansion of the sleeve 420 and the pin 320 is obtained. During operation, the pin 320 expands in both the longitudinal direction and a radial direction. At the position of the conical outer surface 324, the expansion causes transmission of force from the pin 320 to the sleeve 420. The cone angle of the conical portion 321 of the pin 320 and the widened portion 423 of the sleeve 420 can be chosen such that in situations involving a rise of temperatures, the pin 320 is not overstressed so that deformation of the material of the pin 320 under the influence of contact to the sleeve 420 is prevented.

For the sake of clarity, it is noted that in the above-described process of putting the bushing 410 in place in the eye 311 of the link plate 310, it is the relatively soft material of the link plate 310 that is made to locally displace and deform, whereas the relatively hard material of the bushing 410 maintains its initial shape, and that in the above-described process of putting the sleeve 420 in place on the pin 320, it is the relatively soft material of the pin 320 that is made to locally displace and deform, whereas the relatively hard material of the sleeve 420 maintains its initial shape.

It is a practical possibility to apply a washer 426 between the sleeve 420 and the lever plate 330, as shown in FIGS. 11 and 12. In such a case, it is a stack of the lever plate 330, the washer 426 and the sleeve 420 that is clamped between the end section 322 of the pin 320 on the one side and the conical portion 321 of the pin 320 on the other side. Advantages involved in applying a washer 426 involve reduction of thermal expansion differences in the longitudinal direction and a possibility to save on the relatively expensive material of the sleeve 420 by reducing the dimension of the sleeve 420 in the longitudinal direction.

It follows from the foregoing that according to the invention, the combination of the bushing 410 and the link plate 310 and the combination of the sleeve 420 and the pin 320 can be designed in such a way that during assembly of the respective combinations, a fixed connection is obtained on the basis of material of the one component being deformed in a predetermined way as the other component is put in place in/on the one component, wherein the other component is provided with recessed portions 411, 421 for receiving bulges of material 316, 323 from the one component, and wherein it is further possible for the one component to be provided with specific deformation features such as the above-mentioned stop edge 315 of the link plate 310. Although good fixation results may be obtained on the basis of the form closed configuration including the recessed portions 411, 421 and the bulges of material 316, 323, the invention does not exclude an application of additional fixation measures such as an application of a locking pin that is arranged to extend through both of the components to be fixedly connected. Further, it may be advantageous if both the combination of the bushing 410 and the link plate 310 and the combination of the sleeve 420 and the pin 320 involve the form closed configuration relying on bulges of material 316, 323 being accommodated in recessed portions 411, 421, but that does not alter the fact that the invention also covers an option of such form closed configuration being applied to only one of the respective combinations.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

Notable aspect of the invention are summarized as follows. The invention relates to a wastegate actuator mechanism 300 comprising an elongated link plate 310 and a pin 320 that is attached to a lever plate 330. The pin 320 extends partially through an eye 311 provided in the link plate 310, and the link plate 310 and the pin 320 are rotatable relative to each other about a rotation axis R extending in the longitudinal direction of the pin 320. The wastegate actuator mechanism 300 further comprises a sliding assembly 400 that is arranged between the link plate 310 and the pin 320 at the position of the eye 311 of the link plate 310, and that comprises a bushing 410 that is fixedly connected to the link plate 310 and a sleeve 420 that is fixedly connected to the pin 320, wherein an inner surface 413 of the bushing 410 and an outer surface 424 of the sleeve 420 are in sliding contact. At an interface of the bushing 410 and the link plate 310, the bushing 410 is provided with recessed portions 411, and bulges of material 316 of the link plate 310 which have been shaped under pressure during assembly of the bushing 410 and the link plate 310 are received in the recessed portions 411. Additionally or alternatively, at an interface of the sleeve 420 and the pin 320, the sleeve 420 is provided with recessed portions 421, and bulges of material 323 of the pin 320 which have been shaped under pressure during assembly of the sleeve 420 and the pin 320 are received in the recessed portions 421. In terms of assembly of the wastegate actuator mechanism 300, this implies an action of fixedly connecting the bushing 410 to the link plate 310 by pressing the bushing 410 into the eye 311 of the link plate 310 and allowing material of the link plate 310 to deform and to be received in recessed portions 411 of the bushing 410 in the process and/or an action of fixedly connecting the sleeve 420 on the pin 320 by arranging the sleeve 420 on the pin 320 and allowing material of the pin 320 to deform and to be received in recessed portions 421 of the sleeve 420 in a process of forming an end section 322 of enlarged diameter on the pin 320.

REFERENCE LIST

100 Turbocharger
110 Turbine housing
120 Compressor housing
130 Inlet of the turbocharger
140 Outlet of the turbocharger
200 Wastegate system
300 Wastegate actuator mechanism
310 Link plate
311 Eye of the link plate 312, 313 Main body surfaces of the link plate
314 Inner surface of the eye
315 Stop edge
316 Bulges of material of the link plate
317 Peripheral recess
320 Pin
321 Conical portion of the pin
322 End section of the pin
323 Bulges of material of the pin
324 Outer surface of the pin
330 Lever plate
340 Actuator
400 Sliding assembly
410 Bushing
411 Recessed portions of the bushing
412 Chamfered outer rim
413 Inner surface of the bushing
414 Outer surface of the bushing
420 Sleeve
421 Recessed portions of the sleeve
422 Spikes
423 Widened portion of the sleeve
424 Outer surface of the sleeve
425 Inner surface of the sleeve
426 Washer
A Entry deformation area
B Stop deformation area
R Rotation axis

The invention claimed is:

1. A wastegate actuator mechanism configured to be used in a wastegate system of a turbocharger,
wherein the wastegate actuator mechanism comprises a elongated link plate, which has an elongated shape, and a pin that is attached to a lever plate, wherein the pin extends partially through an eye provided in the link plate, and wherein the link plate and the pin are rotatable relative to each other about a rotation axis extending in the longitudinal direction of the pin, wherein the wastegate actuator mechanism further comprises a sliding assembly arranged between the link plate and the pin at the position of the eye of the link plate, wherein the sliding assembly comprises a bushing that is fixedly connected to the link plate and a sleeve that is fixedly connected to the pin, and wherein an inner surface of the bushing and an outer surface of the sleeve are in sliding contact,
wherein at an interface of the bushing and the link plate, the bushing is provided with recessed portions and bulges of material of the link plate are received in the recessed portions, and
wherein the recessed portions of the bushing are notches that are distributed at a regular distance in a peripheral direction on chamfered outer rims of the bushing which are present at each of two axial ends of the bushing.

2. The wastegate actuator mechanism according to claim 1, wherein at the interface of the bushing and the link plate, the bushing is provided with recessed portions and bulges of material of the link plate are received in the recessed portions, and wherein the bushing comprises another material than the link plate, the material of the bushing having a higher hardness than the material of the link plate.

3. The wastegate actuator mechanism according to claim 2, wherein the bulges of material of the link plate and the recessed portions of the bushing are configured to prevent relative movement of the link plate and the bushing in a peripheral direction.

4. The wastegate actuator mechanism according to claim 1, wherein the bushing is locked in the longitudinal direction between bulges of material of the link plate located at the two axial ends of the bushing.

5. The wastegate actuator mechanism according to claim 2, wherein the recessed portions of the bushing comprise grooves which extend along an outer surface of the bushing in the longitudinal direction.

6. The wastegate actuator mechanism according to claim 1, wherein at the interface of the sleeve and the pin, the sleeve is provided with recessed portions and bulges of material of the pin are received in the recessed portions, and wherein the sleeve comprises another material than the pin, the material of the sleeve having a higher hardness than the material of the pin.

7. The wastegate actuator mechanism according to claim 6, wherein the bulges of material of the pin and the recessed portions of the sleeve are configured to prevent relative movement of the pin and the sleeve in a peripheral direction.

8. The wastegate actuator mechanism according to claim 6, wherein at the interface of the sleeve and the pin, the sleeve is provided with spikes penetrating into the material of the pin.

9. The wastegate actuator mechanism according to claim 6, wherein at the interface of the sleeve and the pin, the pin has a conical portion that is shaped like a truncated cone, and wherein the inner surface of the sleeve tapers at the position of a portion of the sleeve that closely surrounds the conical portion of the pin.

10. A wastegate system of a turbocharger, including a wastegate actuator mechanism according to claim 1.

11. A turbocharger, comprising a wastegate system including a wastegate actuator mechanism according to claim 1.

12. The wastegate actuator mechanism according to claim 1, wherein at an interface of the sleeve and the pin, the sleeve is provided with recessed portions and bulges of material of the pin are received in the recessed portions.

* * * * *